June 23, 1964 — E. POHL — 3,138,018

DYNAMOMETER

Filed May 12, 1961 — 2 Sheets-Sheet 1

INVENTOR:
EUGENE POHL
BY Howson & Howson
ATTYS.

June 23, 1964     E. POHL     3,138,018

DYNAMOMETER

Filed May 12, 1961     2 Sheets-Sheet 2

INVENTOR:
EUGENE POHL
BY Howson & Howson
ATTYS.

United States Patent Office 3,138,018
Patented June 23, 1964

3,138,018
DYNAMOMETER
Eugene Pohl, 321 Leona Ave., Huntingdon Valley, Pa.
Filed May 12, 1961, Ser. No. 109,553
5 Claims. (Cl. 73—116)

The present invention relates to new and useful improvements in hydraulic dynamometers and more particularly to new and useful improvements in hydraulic (test apparatus) dynamometers which may serve both as motoring units to drive equipment at a predetermined or measurable power and as brake or loading units to test the power output or torque developed by a power generating device.

The preformance and reliability of turbines, motors, engines and similar power generating devices and many other power driven machines must be evaluated in factories and laboratories. Dynamometers are most universally used to determine the performance of such machines with reliability and accuracy and also to check and verify production machines to insure that each unit meets the required design or manufacturing standards. One of the most widely used functions of a dynamometer is that of serving as a power absorber or load brake during tests of a power generating device to accurately measure the force or torque developed by the device. This type of dynamometer is connected to the power output shaft of the power generating device or machine and provides an accurate indication of the torque developed at the different operating temperature and speeds. Another widely used function of a dynamometer is for driving the device under tests to determine friction power losses, for example, within a power generating machine and to determine losses due to bearing friction, windage, hydraulic drag and other losses. This motoring type of dynamometer may be used to start an engine or turbine without load and drive the engine or turbine or other device at any required speed until a stable or desired temperature has been reached, and provide an accurate measurement of the force required to drive the device.

Prior to the present invention there had been no commercially useable hydraulic unit which could efficiently serve both the driving and load functions of dynamometers to determine, for example, the torque developed by a power generating device and thereafter determine friction and windage losses and other losses in the device being tested. One reason why hydraulic absorption dynamometers have not been used to serve a driving function is that the rotor discs are purposely made to resist the flow of liquid and would be extremely inefficient if it was attempted to be used as a drive unit. Previously, if it was desired to determine the torque developed by a power generating device and losses within a device, it was necessary to first connect the power generator to a hydraulic dynamometer which would serve as a brake or load during the test and operate the power generator at the desired speed until the power generator reached the desired operating temperature. At this time, the absorption or brake dynamometer could be used to measure the torque developed. Thereafter, the device under test would have to be removed from the absorption or brake dynamometer and connected with a motoring dynamometer. The motoring dynamometer would then be used to drive the power generator under test until the power generator reached the desired operating speed and temperature. The motoring dynamometer would then provide an accurate measurement of the forces required to drive the device and thus, give an indication of the various losses within the device under test.

With the foregoing in mind a primary object of the present invention is to provide a hydraulic dynamometer which will serve both the motoring and the load functions. For example, the dynamometer of the present invention could be used in conjunction with an internal combustion engine for initially providing torque to start the internal combustion engine and when the engine is running under its own power, apply a load to the engine and measure the torque developed at particular operating speeds and temperatures. Thereafter, while the internal combustion engine is still operating the ignition system of the engine could be interrupted, the load applied to the engine by the dynamometer effectively removed, and the dynamometer energized to serve as a motoring unit to drive the engine at the same rotational speed at which the engine had previously been running. The dynamometer would then indicate the torque required to drive the engine in its existing operating state and provide an indication of the various losses within the engine.

Various other objects of the present invention and the features and details of the operation and construction thereof are hereinafter more fully set forth and described with reference to the accompanying drawings, in which.

Figure 1:
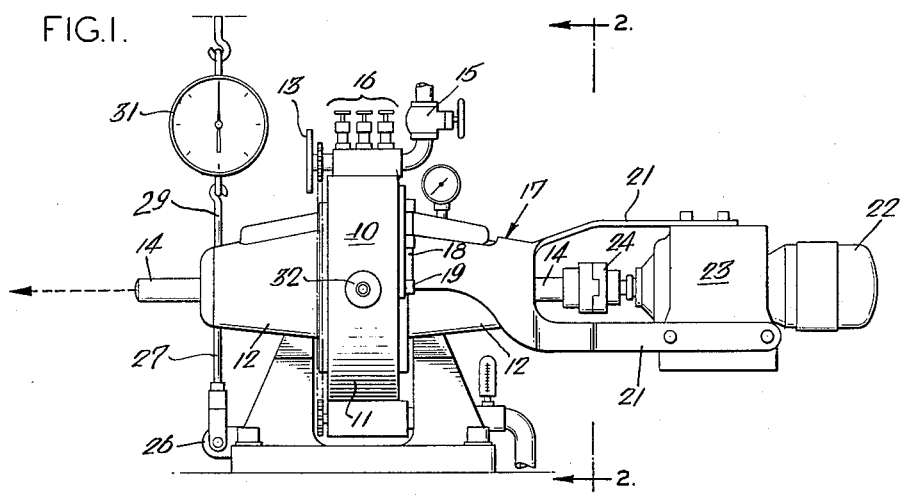
FIG. 1 is a side elevational view of one form of dynamometer made in accordance with the present invention.
Figure 2:
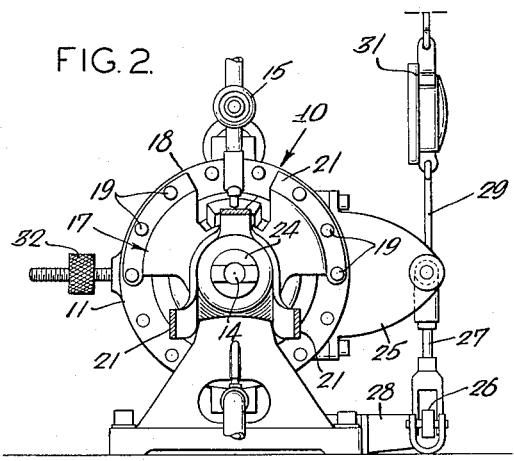
FIG. 2 is a sectional view taken on line 2—2, FIG. 1.

Referring more specifically to the drawings, FIGS. 1 and 2 thereof illustrate one form of apparatus made in accordance with the present invention. The dynamometer of the present invention as illustrated in FIGS. 1 and 2 includes a conventional hydraulic absorption dynamometer unit, designated generally as 10, which in the present instance is illustrated as a hydraulic absorption dynamometer such a dynamometer manufactured by Taylor Dynamometer & Machine Co. of Milwaukee, Wisconsin, Model No. D 33S. This dynamometer has a central casing 11 mounted for rotary movement between two stationary end bearings or trunions 12, 12. Within the central casing 11 is a series of rotor discs or plates turning within a series of stator plates or vaned compartments, and in which fluid volume may be determined by adjusting valves 15 and 16 and discharge valve by handwheel 13. A central shaft 14 extends longitudinally of the casing 11 and end bearings 12, 12. The shaft 14 carries one or more rotor discs (not shown) which are opposed by the stator plates carried by the central casing 11 so that when a liquid is admitted to the casing 11 rotation of the shaft 14 will cause a torque to be exerted on the casing 11. Fluid is admitted to the interior of the casing 11 through the main control valve 15 and the series of hand valves 16 are provided to control the flow of liquid to the section or cavities.

In accordance with the present invention, drive means is connected directly to one end of the shaft 14 in order to drive the shaft, with the drive means being carried by the rotatable casing 11 of the dynamometer unit so that torque exerted by the drive means is transmitted directly to the casing of the dynamometer unit 10. This is accomplished, in the form of the invention illustrated in FIGS. 1 and 2, by providing a mounting bracket 17 which has a flange portion 18 thereon bolted or otherwise secured to the casing of the dynamometer unit as indicated at 19. Projecting outwardly from the mounting bracket 17 is a plurality of legs 21, in the present instance three such legs being illustrated, which carry the drive unit. The drive means in the form of the invention illustrated in FIGS. 1 and 2 consists of a conventional motor 22 and an adjustable hydraulic or fluid drive unit 23. The fluid drive unit may be any conventional fluid drive unit such as, for example, a type VS Class 2 Gyrol Fluid Drive unit as manufactured by American Blower Corporation of Detroit, Michigan. This fluid drive unit 23 is an adjustable speed unit and has its input shaft connected to the output of the motor 22 and its output shaft interconnected with the shaft 14 of the dynamometer unit, for example, by means of a coupling 24.

In order to measure the torque exerted on the casing 11 of the dynamometer unit a beam scale, dial scale, potentiometer, variable differential transformer, proving ring, hydraulic or air cell, or other transducer, or similar measuring apparatus may be used. In the embodiment illustrated in the drawings, a radial arm 25 is secured to the casing 11 and interconnected with a scale arm 26 by means of an adjustable connecting link 27. The scale arm 26 is pivotally secured to one end of a bracket 28 carried by the mounting frame of the unit and at its other end secured to a connecting link 29 which in turn is fixed to a scale indicator 31. The adjustable connecting link 27 interconnects the radial arm 25 of the dynamometer with the mid-point of the scale arm 26 so that the reading on the scale indicator 31 provides an indication of the amount of torque exerted on the casing 11. With this measuring system an adjustable balance weight such as indicated at 32 may be provided to counter-balance the weight of the scale arm 25.

This above described apparatus may be used in testing, for example, an internal combustion engine to determine both the torque developed by the internal combustion engine at any selected speed and also to determine the internal friction and windage losses, etc. within the internal combustion engine. To accomplish this the internal combustion engine would be connected to the free end of the shaft 14 by means of any suitable coupling and the internal combustion engine would be started. After the engine is running under its own power and has reached equilibrium conditions at the selected speed with its temperature stabilized, the torque produced by the engine may be read on the scale 31 of the dynamometer. When the engine being tested is running the motor 22 would not be energized and the fluid drive coupling between the motor 22 and shaft 14 would be set so that the motor 22 would not exert any drag on the shaft 14. After determining the torque output of the internal combustion engine and in order to learn the various internal losses of the engine the ignition system of the engine would be interrupted and the absorption section of the dynamometer effectively removed by discharging the fluid within the casing 11 and closing the internal fluid valve 15 to insure that no fluid returns to that section. The electric motor 22 would then be energized and the fluid coupling set to drive the internal combustion engine at the same rotational speed at which the engine had previously been running. The indicator scale 31 would then indicate the torque required to drive the internal combustion engine in its existing state and would be a measurement of the internal losses within the internal combustion engine. Similarly, various engine accessories such as fans, pumps, etc. could be tested for efficiency or parasitic effects. In addition to manual control of the apparatus, this apparatus may also be automatically controlled and any desired cycling or programming system may be used by automatically controlling the operation of the valves 13, 15, and 16 and the operation of the fluid drive unit 23.

Figure 3:
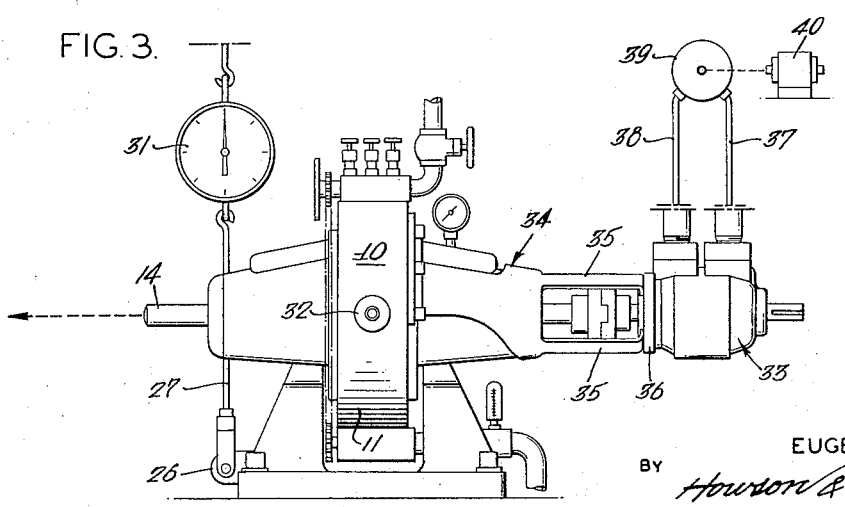
FIG. 3 is a side elevational view of another form of dynamometer made in accordance with the present invention.

FIG. 3 of the drawings illustrates a modified form of apparatus of the present invention in which the drive means for driving the dynamometer shaft 14 to cause the dynamometer to carry out its motoring function consists of a hydraulic motor, designated generally as 33. In this embodiment a mounting bracket 34 is mounted directly to the casing 11 of the dynamometer unit. Projecting outwardly from the mounting bracket 34 is a plurality of legs 35 to which the mounting flange 36 of the hydraulic motor 33 is secured. A pair of flexible conduits 37 and 38 are provided connected to the hydraulic motor to serve as inlet and outlet conduits for the hydraulic fluid rotating the motor 33. The conduits 37 and 38 in turn are connected with a pump 39 which may be driven in any suitable manner, for example, by means of a motor 40. With this construction, the pump 39 and motor 40 may be mounted remote from the dynamometer unit and separately controlled in any desired manner. In addition to manual control of this apparatus, the apparatus may be automatically controlled by any desired cycling or programming system by automatically controlling the operation of the valves to the hydraulic absorption dynamometer unit and by automatically controlling the output of the pump 39.

With this above construction, the feed of the pump 39 and motor 40 may be controlled to in turn control the speed of the hydraulic motor 33 and the amount of power supplied to the shaft 14. The operation of the unit described in connection with FIG. 3 for the testing of a power generating device both for determining output and internal losses will be substantially the same as the operation of the unit described in conjunction with the embodiment of FIGS. 1 and 2. Another major use of this device is in determining the efficiency of a fan for cooling an electric induction motor. The electric motor, once it had run long enough to stabilize its temperature rise against the load imposed by the dynamometer absorption section, would be de-energized and the absorption section of the dynamometer removed by discharging of fluid from the casing and closing the inlet fluid valve. Thereafter, the motor 40 and pump 39 may be started to drive the motor at the same rotational speed at which the motor had previously been running. The dynamometer scale would then give an indication of the torque required to drive the motor rotor assembly and fan being tested. The direction of rotation of the motoring section of the dynamometer could also be reversed by reversing the direction of rotation of the motor 40 to determine if the fan losses are greater in one direction of rotation than in the other.

Figure 4:
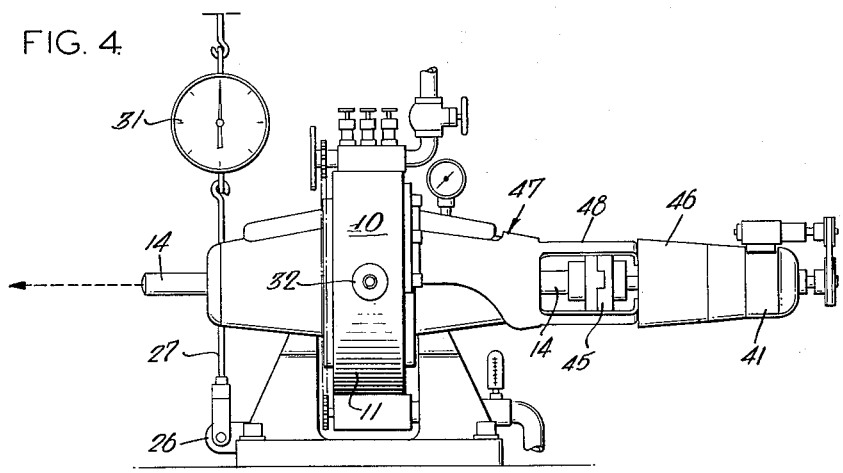
FIG. 4 is a side elevational view of a further modified form of dynamometer of the present invention.
Figure 5:
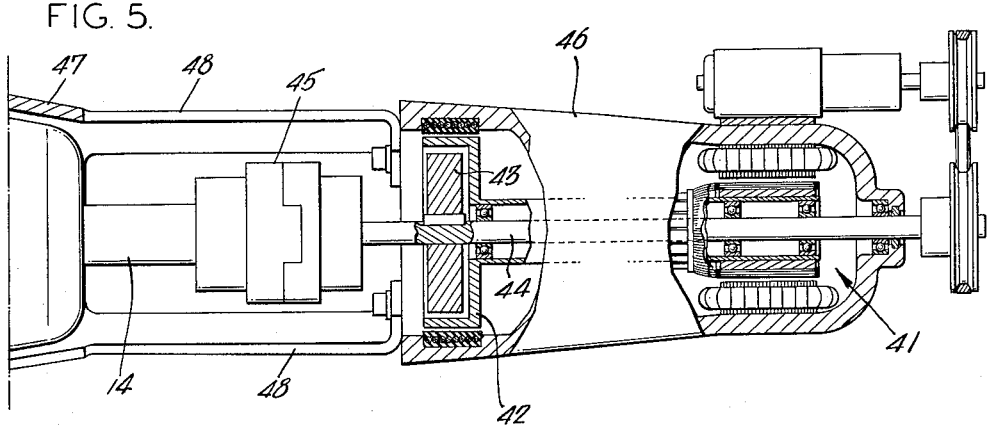
FIG. 5 is an enlarged fragmentary longitudinal sectional view of the motoring unit for the dynamometer of FIG. 4.

FIGS. 4 and 5 illustrate a further modified form of dynamometer made in accordance with the present invention in which drive means comprises a conventional motor 41 which causes rotation of an outer cup 42 of a conventional magnetic clip or eddy-current clutch or coupling with the inner disc 43 of the clutch being keyed to a shaft 44 which in turn is connected to the central shaft 14 of the dynamometer unit by means of a conventional coupling 45. Both the motor 41 and the magnetic slip clutch are contained within a housing 46 which is supported from the casing 11 of the dynamometer unit 10 by means of a mounting bracket 47. The mounting bracket 47 is bolted or otherwise secured to the casing 11 and has a series of rearwardly projecting legs 48 which in turn are bolted or otherwise secured to the casing 46. With the drive unit consisting of an electric motor and magnetic or eddy-current coupling of the clutch, the power supplied to the electric drive motor may be controlled by any desired cycling or programming system. By drivably rotating the cup 42 of the clutch or coupling in a direction opposite to the direction of rotation of the engine being tested, the useful speed range and torque characteristics of the dynamometer when it is being used as an absorption dynamometer may be extended greatly. Normally in a hydraulic absorption dynamometer the torque at zero speed is zero and the torque or horsepower capacity increases directly with the cube of the speed of rotation. However, by rotating the cup 42 in a direction opposite to the direction of rotation of the engine being tested, there will be a torque rating when the shaft 14 is stationary, thus permitting accurate readings of torque at very low speeds of rotation of the shaft 14. This obtaining of an accurate torque reading at low speeds of rotation normally cannot be accomplished with a conventional hydraulic absorption dynamometer.

In operation of this form of the apparatus of the present invention, the device to be tested is drivably connected to the shaft 14 of the dynamometer unit and driven in a manner described in conjunction with the embodiment of FIGS. 1 and 2 to determine the torque output. Thereafter, the motoring unit, in this case the motor 41, is energized and the dynamometer is used as a motoring dynomometer to determine various internal losses. In place of the motor 41 and the magnetic slip or eddy-current clutch or coupling a variable speed A.C. or D.C. motor may be used as the drive unit for the central shaft 14.

While particular embodiments of the present invention have been illustrated and described herein, it is not intended to limit the disclosure and changes and modifications may be incorporated and embodied therein within the scope of the following claims.

I claim:

1. A motoring and absorption dynamometer for testing machines, comprising; a shaft adapted to be interconnected with the machine to be tested, an enclosed casing surrounding said shaft, means rotatably mounting said casing for rotatable movement about the axis of said shaft within predetermined limit positions, a hydraulic absorption unit positioned within said casing, said hydraulic absorption unit having separate elements thereof separately interconnected with said casing and said shaft providing a hydraulic drive connection between said shaft and said casing operable to transmit torque applied to said shaft to said casing, first control means to interrupt the transmission of torque by the hydraulic absorption unit from said shaft to said casing, a torque indicator connected to said casing operable to indicate the amount of torque applied to said casing, a hydraulic fluid drive motor, adjustable pump means operable to provide hydraulic drive fluid to said hydraulic fluid drive motor to drive the same, means drivably connecting said hydraulic fluid drive motor to said shaft, a mounting member fixed to said casing and mounting said hydraulic fluid drive motor to transmit the torque exerted by said hydraulic fluid drive motor on said shaft to said casing, and second control means connected to said pump means to control operation of said pump means and said hydraulic fluid drive motor and interrupt exertion of torque on said shaft by said hydraulic fluid drive motor.

2. A motoring and absorption dynamometer for testing machines, comprising in combination, a dynamometer unit including a turnable torque measuring casing mounted on bearings at each end, a torque indicator connected to said casing operable to indicate the amount of torque applied to said casing, a rotor mounted within said casing, a shaft mounted in bearings at each end of the casing and rotatably supporting the rotor within said casing, said casing and rotor being provided with interacting torque means therebetween and controls for selectively rendering the torque means effective or ineffective, a support secured to said casing and having its outer end extending beyond the bearings for said casing and shaft, and a drive motor for said shaft, said drive motor including a turnable casing secured to said support and a motor rotor turnable in said motor casing and selectively connectible to drive said dynamometer shaft.

3. Apparatus as set forth in claim 2, further characterized by the fact that power drive connection means are provided for selectively connecting said motor shaft with said dynamometer shaft.

4. Apparatus as set forth in claim 3, further characterized by the fact that said power drive connection means comprises an adjustable hydraulic drive unit.

5. Apparatus as set forth in claim 3, further characterized by the fact that said power drive connection means is a magnetic clutch provided with means for selectively controlling its action.

References Cited in the file of this patent
UNITED STATES PATENTS

| | | |
|---|---|---|
| 2,336,838 | Bennett | Dec. 14, 1943 |
| 2,389,572 | Winther | Nov. 20, 1945 |
| 2,445,095 | Winther | July 13, 1948 |